United States Patent
Watanabe

(10) Patent No.: US 7,734,016 B2
(45) Date of Patent: Jun. 8, 2010

(54) RADIOGRAPHIC IMAGING APPARATUS AND METHOD

(75) Inventor: Tetsuo Watanabe, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/124,676

(22) Filed: May 21, 2008

(65) Prior Publication Data

US 2009/0010394 A1  Jan. 8, 2009

(30) Foreign Application Priority Data

Jul. 3, 2007  (JP)  ............................. 2007-174700

(51) Int. Cl.
*G21K 1/00* (2006.01)

(52) U.S. Cl. ..................... 378/145; 378/62; 378/150; 378/151; 378/117

(58) Field of Classification Search .................. 378/19, 378/91, 98.8, 114–117, 145–153, 197, 205, 378/62

See application file for complete search history.

(56) References Cited

U.S. PATENT DOCUMENTS

| 5,237,599 A * | 8/1993 | Gunji et al. ................. 378/148 |
| 7,236,572 B2 * | 6/2007 | Maschke ..................... 378/146 |

* cited by examiner

*Primary Examiner*—Jurie Yun
(74) *Attorney, Agent, or Firm*—Fitzpatrick, Cella, Harper & Scinto

(57) ABSTRACT

A system is in a standby mode as an imaging preparation condition in step S1. If gripping of an operation handle is detected in step S2, the operation goes to step S3, in which an electromagnetic brake is released, thereby allowing a radiation detector to be rotated substantially around the center of an imaging region. If a rotation angle is detected in step S5, a first limiting device covering an effective imaging region of the radiation detector is changed to a second limiting device so as to be constantly arranged within the effective imaging region even during rotation of the radiation detector.

13 Claims, 10 Drawing Sheets

FIG. 3A
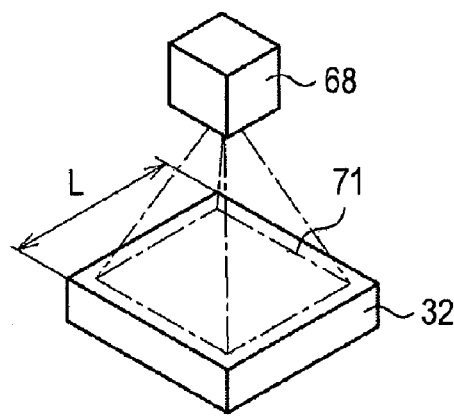
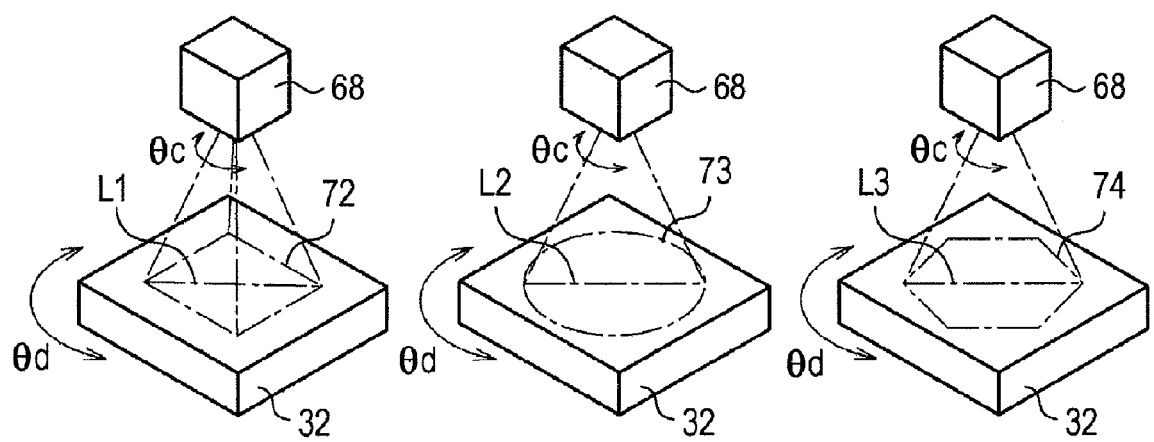
FIG. 3B    FIG. 3C    FIG. 3D

RADIOGRAPHIC IMAGING APPARATUS AND METHOD

BACKGROUND OF THE INVENTION

1. Field of the Invention

The present invention relates to a radiographic imaging apparatus that performs imaging for radiation passing through a subject, and more particularly to control of an irradiation form of radiation.

2. Description of the Related Art

Hitherto, an apparatus, which obtains a radiographic image of a subject by irradiating the subject with radiation and detecting an intensity distribution of the radiation passing through the subject, has been widely used in the fields of industrial non-destructive inspection and medical diagnosis. A typical imaging method may be a film/screen method for radiation. The film/screen method is an imaging method which uses a photosensitive film, and a scintillator sensitive to radiation. The method requires chemical processing for development, and hence, it is difficult to perform real-time imaging.

In contrast, an imaging system using an image intensifier can perform real-time movie recording. For example, a mobile X-ray fluoroscopy apparatus 1 shown in FIG. 9 is known as an apparatus using an image intensifier. The X-ray fluoroscopy apparatus 1, which is provided with casters at a lower portion thereof, includes a carriage 2 and a horizontal shaft 3 provided above the carriage 2. The carriage 2 is horizontally movable by the casters. The horizontal shaft 3 can move horizontally as indicated by arrow Mh and vertically as indicated by arrow Mv, and rotate around a vertical supporting axis as indicated by arrow Rv. A C-shaped arm member 4 is fixed to a tip end of the horizontal shaft 3.

An X-ray source 5 and an image intensifier 6 are oppositely arranged at both tip ends of the arm member 4 so as to face each other. The arm member 4 is configured to rotate around a horizontal axis as indicated by arrow Rh in accordance with a movement of the horizontal shaft 3, and to rotate and move along a C-shaped locus as indicated by arrow Rc. The X-ray fluoroscopy apparatus 1 can align the X-ray source 5 and the image intensifier 6 at various positions with respect to a subject, by way of a plurality of moving mechanisms containing the movement of the horizontal shaft 3.

The X-ray source 5 outputs X-rays to a subject arranged inside the arm member 4. Then, the image intensifier 6 arranged opposite to the X-ray source 5 converts an X-ray image passing through the subject into an optical image. The optical image converted by the image intensifier 6 is optically condensed by an optical lens, and converted into an electrical signal by a TV camera. The electrical signal is reproduced as a visible image on a cathode-ray tube (CRT) or the like. The image information is A/D converted to be stored as a digital signal, processed with various image processing techniques to be useful information, and used in various diagnostic applications. Thus, a medical imaging diagnostic technology has progressed.

Meanwhile, in recent years, a semiconductor process technology has developed. In particular, a flat panel detector (FPD) which performs imaging for a radiographic image with a semiconductor sensor has been developed. FIG. 10 is a schematic illustration showing a radiographic system using such a FPD. A radiation source device 11 irradiates a subject P with radiation, and a radiographic imaging apparatus 13 containing a FPD 12 performs imaging for radiation passing through the subject P. The FPD 12 is a flat detector in which photoelectric conversion elements are arrayed on a flat substrate in a two-dimensional grating. The FPD 12 converts the radiation into visible light through a scintillator. The photoelectric conversion elements arrayed in the two-dimensional grating detect the visible light as an electrical signal. A controller 14 that controls the driving of the reading, image transferring, and the like, is connected to the radiographic imaging apparatus 13. The controller 14 performs digital image processing on an image output from the radiographic imaging apparatus 13, and allows a monitor 15 to immediately display a radiographic image of the subject P.

The image intensifier 6 of the related art has an X-ray incidence plane with a diameter of 6 to 12 inches. With regard to the optical condensing unit, the image intensifier 6 has a cylindrical shape being long toward the incidence plane. In some cases, the image intensifier 6 may not be installed at a desired position depending on the size. Thus, a reduction in thickness of the X-ray detector is demanded.

In contrast, the FPD 12 is a flat detector, and hence, an optical condensing system such as an image intensifier 6 is not necessary, thereby reducing the thickness of the X-ray detector. Also, an image would not be deformed at a peripheral portion, and an entire rectangular region can be effectively used.

In such an imaging system, a detecting panel is installed at a pedestal dedicated to an imaging mode for a standing position, a lying position, or the like. The detecting panel is selected as desired, and the imaging system is installed in and fixed to a radiation room. The imaging system is further reduced in weight, and is used instead of the image intensifier 6, in a mobile X-ray fluoroscopy apparatus, for example, as disclosed in Japanese Patent Laid-Open No. 2005-470.

When the X-ray detector is to be aligned with the subject, since the image intensifier of the related art has a symmetric cylindrical external shape, the X-ray detector need not be rotated within the X-ray incidence plane. To rotate an image, image processing is performed, or an optical system is rotated in the detector.

However, since the FPD has a rectangular shape because of a manufacturing process using a glass substrate and a circuit structure, the FPD must be aligned with the subject, and thus, is rotated within the plane.

In many cases, the X-ray imaging apparatus has an X-ray limiting mechanism to prevent emitted X-rays from leaking from the X-ray detector to the outside. In the case of a circular detector such as an image intensifier, even when the image intensifier is rotated, a beam limiting region does not exceed an imaging region as long as the image intensifier is rotated around the center.

In contrast, in the case of the rectangular detector, a beam limiting form 21 is also rectangular as shown in FIG. 11. Hence, even when a detector 22 is rotated within a plane around the center S of the detector 22, an angle of the detector 22 can be misaligned with an angle of the beam limiting form 21. In this case, a region 23 may appear in which X-rays leak to the rear side. Technically, it is possible to measure both angles and automatically align them with each other. However, such a configuration may increase the cost.

SUMMARY OF THE INVENTION

In light of the above situations, the present invention provides a radiographic imaging apparatus capable of preventing radiation from leaking to the rear side of a detector.

For example, a radiographic imaging apparatus according to an aspect of the present invention includes a radiation detector configured to convert radiation into an image signal; a supporter configured to support the radiation detector rotatably around a rotation axis as a rotation center; a radiation source configured to emit the radiation toward the radiation detector; and a changing unit configured to change an irradiation form of the radiation emitted from the radiation source, in accordance with a change in rotation angle with time, which is an angular speed or an angular acceleration, with respect to the rotation axis of the radiation detector.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 3A to 3D are explanatory illustration showing rotating conditions of the detector.

DESCRIPTION OF THE EMBODIMENTS

Preferred embodiments of the present invention will now be described in detail in accordance with the accompanying drawings.

First Exemplary Embodiment

Figure 1:
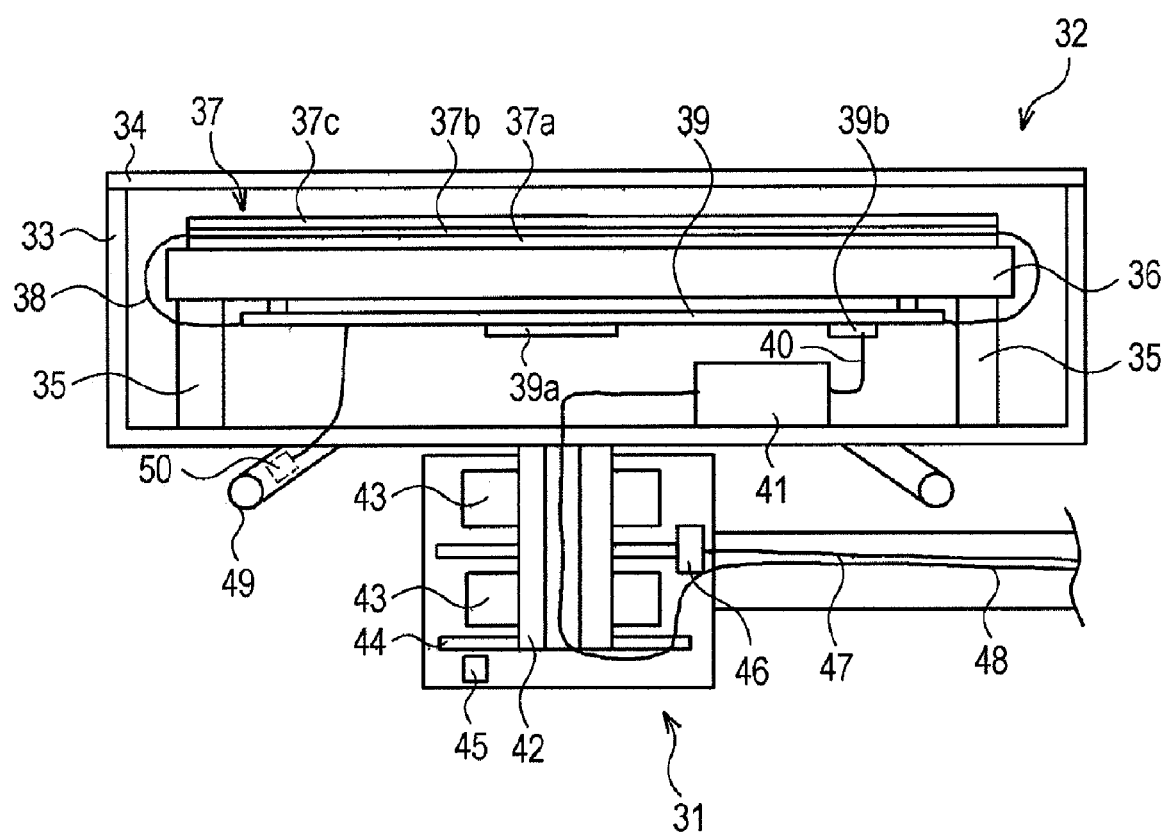
FIG. 1 is a cross section showing a detector and a supporter according to a first embodiment.

FIG. 1 is a cross section showing the inside of a supporter 31 and a radiation detector 32 of a radiographic imaging apparatus according to a first embodiment. The radiation detector 32 is mounted above the supporter 31. The radiation detector 32 includes a box-like casing 33, an upper side of which is open. The upper side is sealed with a casing cover 34 made of a highly X-ray-transmissive material. A metal base 36 is fixed in the casing 33 with supporting portions 35 interposed therebetween. An X-ray image detecting panel 37, in which a substrate 37a, photoelectric conversion elements 37b, and a scintillator plate 37c are laminated, is provided on the base 36.

The substrate 37a is typically a glass plate because a glass plate has no chemical reaction to a semiconductor element, resists heat at a temperature of a semiconductor process, and satisfies a requirement of dimensional stability. On the substrate 37a, the photoelectric conversion elements 37b are formed in a two-dimensional array by a semiconductor process. The scintillator plate 37c is formed such that a resin plate is coated with a scintillator of a metallic compound. The scintillator plate 37c is integrated with the substrate 37a and the photoelectric conversion elements 37b by bonding.

In addition, flexible circuit boards 38 defining a reading circuit and a driving circuit are connected to lateral sides of the layer of the photoelectric conversion elements 37b. The photoelectric conversion elements 37b are connected to a circuit board 39. The circuit board 39 has thereon electronic components 39a and 39b for processing a photoelectrically converted electrical signal. Hence, the X-ray image detecting panel 37 has a rectangular shape. In general, the reading circuit and the driving circuit are respectively arranged at sides being orthogonal to each other. The circuit board 39 is connected to a relay electrical circuit 41 via a cable 40.

The supporter 31, serving as a rotation supporting unit, has therein a spindle 42 for rotating the radiation detector 32. The spindle 42 is rotatably supported by bearings 43. The spindle 42 has a hollow portion, and is provided with a driving unit including a disk-like portion 44 and an electromagnetic brake 45. Accordingly, the rotation of the radiation detector 32 can be controlled by an electrical unit. In order to permit a rotation operation when an operator rotates the radiation detector 32, an operation switch (not shown) is provided.

The supporter 31 has therein an angular-position detector 46 including, for example, an encoder for detecting the rotation of the radiation detector 32. The angular-position detector 46 is connected to an external control unit via a cable 47. The relay electrical circuit 41 in the radiation detector 32 is connected to the external control unit via a cable 48 through the hollow portion in the spindle 42 for power supply, signal transfer, and other purpose.

Further, an operation handle 49 is provided on the back side of the radiation detector 32 for manual rotation of the radiation detector 32. The operation handle 49 contains a touch sensor 50 for detecting whether the operation handle 49 is being gripped or not.

The radiation detector 32 is combined with an X-ray tube, serving as an X-ray source. X-ray imaging is available by imaging of a radiation distribution of X-rays passing through a subject. When the X-rays passing through the subject are incident from the upper side of the radiation detector 32, the X-rays are transmitted through the casing cover 34, and are incident on the X-ray image detecting panel 37. Then, the scintillator plate 37c of the X-ray image detecting panel 37 emits light. The photoelectric conversion elements 37b arranged in the two-dimensional array convert the light into an electrical signal. The electrical signal is transferred as image information, and accordingly, an image can be immediately observed on a monitor.

Figure 2:
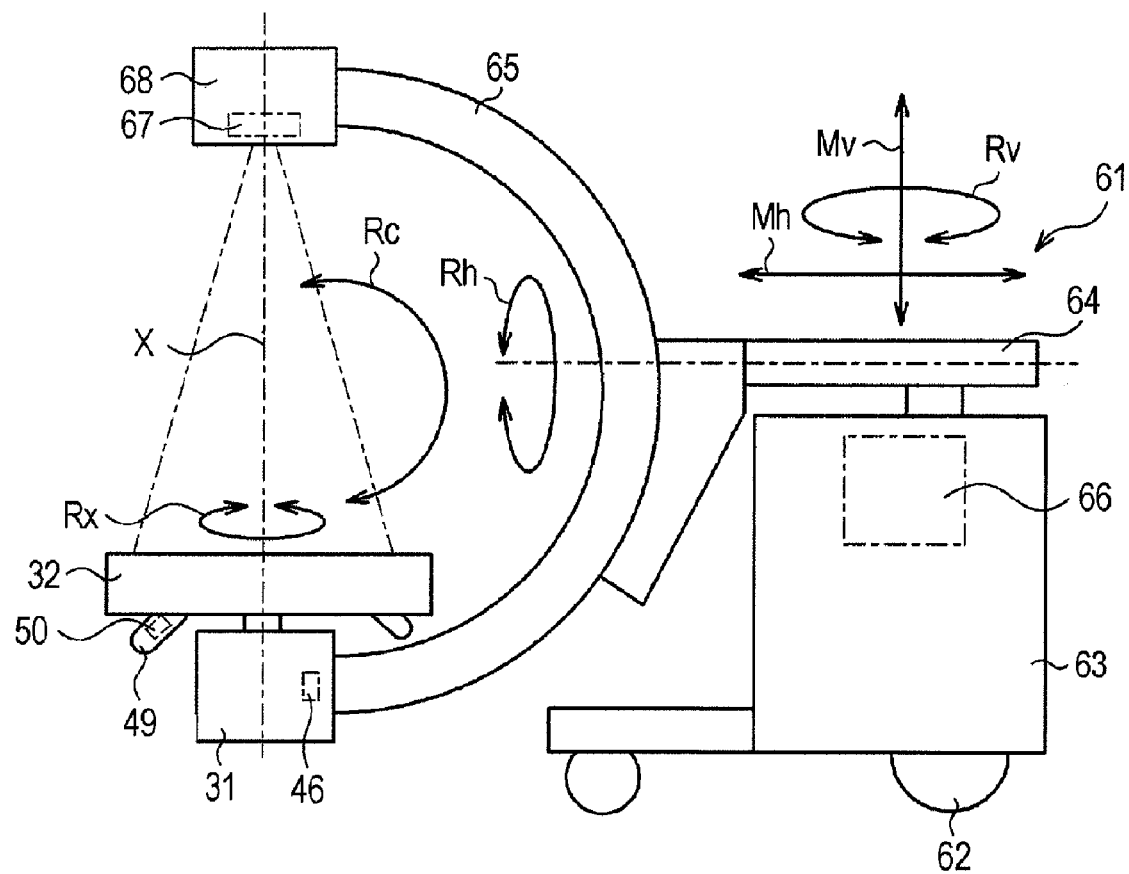
FIG. 2 is a configuration diagram showing a holding device for supporting the detector.

The radiation detector 32 may be combined with various types of holding devices. As a typical example, the radiation detector 32 is used in combination with a mobile C-arm device 61 shown in FIG. 2. The typical mobile C-arm device 61 has a horizontal shaft 64 above a main body 63 having casters 62. The horizontal shaft 64 can move vertically and horizontally as indicated by arrows Mv and Mh, and rotate as indicated by arrow Rv. A C-shaped arm member 65 is fixed to a tip end of the horizontal shaft 64. The arm member 65 can be rotated as indicated by arrows Rc and Rh. The main body 63 contains a controller 66 that controls members provided at the mobile C-arm device 61.

An X-ray source 68 is mounted at one end of the arm member 65. The X-ray source 68 contains an X-ray limiting device 67, serving as a leaking radiation beam limiting device. The radiation detector 32 is mounted at the other end of the arm member 65 so as to face the X-ray source 68. The radiation detector 32 is rotatably supported above the supporter 31 as shown in FIG. 1. The X-ray source 68 and the radiation detector 32 are supported at a constant distance therebetween. The X-ray source 68 and the radiation detector 32 can be aligned at a desired angle to a subject which is arranged therebetween, by the above-described mechanisms.

In general, the X-ray limiting device 67 is made of heavy metal such as lead having a high X-ray-shielding factor. For example, in view of an exposure to the subject, a plurality of beam limiting forms are prepared. The X-ray limiting device 67 includes a pair of mechanisms arranged orthogonally to each other. Each mechanism has two plates and changes an aperture width by horizontally moving the two plates. Accordingly, a beam limiting form 71 defining a first rectangular beam limiting form is provided as shown in FIG. 3A. The beam limiting form 71 can be changed to a beam limiting form 72 defining a second beam limiting form with a reduced size of the beam limiting form 71 as shown in FIG. 3B, a beam limiting form 73 defining a circular second beam limiting form as shown in FIG. 3C, a beam limiting form 74 of a polygonal second beam limiting form as shown in FIG. 3D, or the like. Accordingly, a desired beam limiting form can be formed.

The radiation detector 32 has an effective imaging region with a rectangular external shape. Unlike a circular image intensifier, a position adjustment is necessary to align a desired range with the effective imaging region depending on a portion of an imaging subject. The movable mechanism of the above-mentioned C-arm device 61 can perform the alignment; however, it is difficult to perform an alignment with high accuracy. To perform an alignment with an efficient operation, the radiation detector 32 should be rotated within a radiation incidence plane. Accordingly, a mechanism is provided for rotating the radiation detector 32 in a direction indicated by arrow Rx in FIG. 2 around the X-axis located substantially at the center of the effective imaging region.

By pressing a switch (not shown), the electromagnetic brake 45 is released, and an operator can manually rotate the radiation detector 32. In particular, the output of the touch sensor 50 in the operation handle 49 is transmitted to the controller 66 in the main body 63 via the circuit board 39 of the radiation detector 32 and the cable 48.

Since the imaging region of the radiation detector 32 is rectangular, a unit configured to automatically rotate the X-ray limiting device 67 is provided so as to align the beam limiting form position. Further, the X-ray limiting device 67 of the radiation detector 32 has a rotation sensing unit configured to sense a rotation angle. The rotation position of the X-ray limiting device 67 is controlled on the basis of the obtained rotation angle.

With such an apparatus, to align a desired portion with the rectangular imaging region, the operator manually performs an alignment operation while the operator views an image displayed on the monitor. The angular-position detector 46 in the supporter 31 detects a rotation amount rotated by the operator, and its output is transmitted to the controller 66 via the cable 48. The X-ray limiting device 67 is driven synchronously with the rotation of the radiation detector 32 in response to an instruction from the controller 66.

At this time, if the operator rapidly changes an angle and if such a change exceeds a performance limit of an actuator for rotation of the X-ray limiting device 67, the beam limiting form cannot follow the change, and hence, X-rays may exceed the external shape of the radiation detector 32 and leak to the rear side. According to this embodiment, in light of the situation, when the detection of a shift to a rotating condition is detected, the beam limiting form is changed so as to be constantly arranged within the effective imaging region even though the beam limiting form is rotated at the radiation detector 32, thereby preventing X-rays from leaking.

Figure 4:
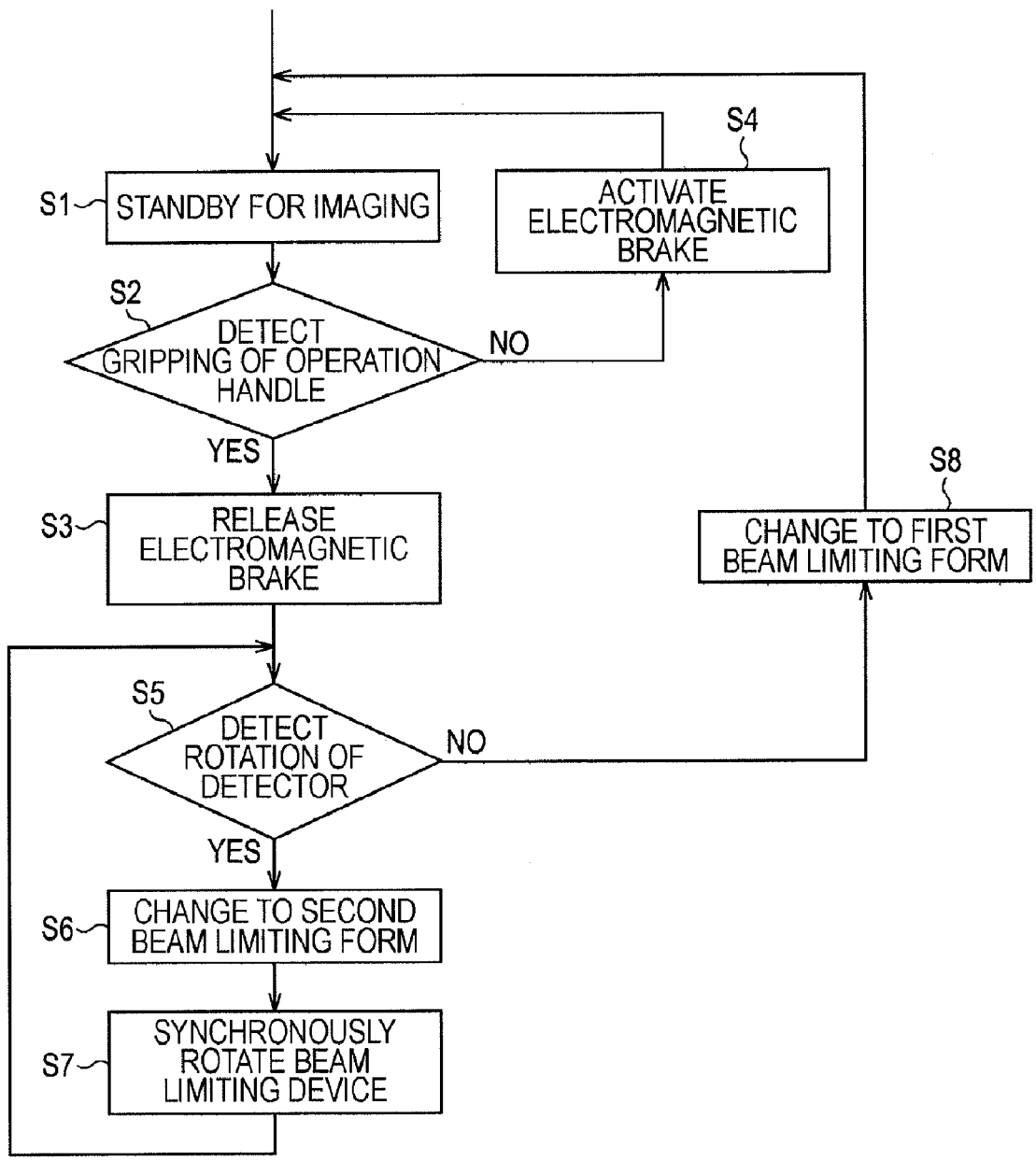
FIG. 4 illustrates a flowchart of a system according to the first embodiment.

FIG. 4 is a flowchart showing an operation according to the embodiment. In step S1, the system including the radiation detector 32 is in a standby mode as an imaging preparation condition. In this condition, it is continuously monitored whether a number of operation switches are pressed or not. If the condition is an off condition in which no operation switch is pressed, the imaging preparation condition is held. The operation switches may include a switch for starting imaging, a switch for releasing a lock so as to move a mechanism such as the arm member 65, and a switch for releasing a lock so as to rotate the radiation detector 32.

The embodiment is for a process dedicated to an operation relating to an alignment of the X-ray limiting device 67 with the radiation detector 32. In step S2, the touch sensor 50 detects gripping of the operation handle 49. In order that the operator performs an alignment of the radiation detector 32, the rotation restriction has to be released first. In the embodiment, the detection of the touch sensor 50 in the operation handle 49 serves as a trigger. When the operation handle 49 is gripped, the touch sensor 50 reacts to the gripping. If the gripping of the operation handle 49 is detected, the operation goes to step S3, in which the electromagnetic brake 45 is released, and the radiation detector 32 becomes rotatable substantially around the center of the imaging region. If the gripping of the operation handle 49 is not detected in step S2, the operation goes to step S4, in which the electromagnetic brake 45 is activated and then the operation returns to step S1.

After the electromagnetic brake 45 is released in step S3, the operation goes to step S5, in which the rotation of the radiation detector 32 is detected. If the operator rotates the radiation detector 32 and the angular-position detector 46 detects the rotation angle, the operation goes to step S6. In step S6, the beam limiting form is changed from a rectangular area of the first beam limiting form 71 covering the effective imaging region of the radiation detector 32 as shown in FIG. 3A, to the second beam limiting forms 72, 73, or 74, which is constantly arranged within the effective imaging region even though the radiation detector 32 is rotated. For example, the second beam limiting form 72 shown in FIG. 3B has a similar rectangular shape, but is reduced in size such that a diagonal line L1 becomes smaller than a short-side dimension L of the radiation detector 32. Alternatively, the beam limiting form may be changed to a circular or polygonal shape of the second beam limiting form 73 or 74 as shown in FIG. 3C or 3D, the second beam limiting form having the most-external-shape dimension L2 or L3 smaller than the short-side dimension of the radiation detector 32.

In step S7, the X-ray limiting device 67 is rotated by an angle θc (=θd) as shown in FIGS. 3A to 3D synchronously with an angle θd of the measured radiation detector 32. If the operator stops rotating the radiation detector 32 in step S5, and the rotation detection turns off, the operation goes to step S8, in which the beam limiting form returns to the first beam limiting form 71. In this state, the operator can determine whether the alignment is effective or not in the entire imaging region.

In particular, if the desired alignment can be obtained, and hence, the operator releases the operation handle 49 and the touch sensor 50 turns off, the electromagnetic brake 45 is activated in step S4. Since the system is thus configured, even when the operator moves the radiation detector 32 at an acceleration exceeding the performance limit of the actuator for rotating the X-ray limiting device 67, X-rays can be prevented from exceeding the external shape of the radiation detector 32 and from leaking to the outside.

Second Exemplary Embodiment

In the first embodiment, the function for preventing X-rays from leaking to the rear side during rotation of the radiation detector 32 is realized by changing the beam limiting form so as to be constantly arranged within the effective imaging region even during rotation. In a case of adjustment for a direction of a portion of interest at a center portion of the imaging effective region, that method is sufficient. However, in a case of alignment for a region of interest at an end portion of the effective imaging region, the alignment has to be checked while the rotation is interrupted. Therefore, further improvement of the method is required. The supporter 31 supporting the radiation detector 32 has a similar configuration to that in the first embodiment. The radiation detector 32 can be arranged at a desired position and posture with respect to a subject by using various movable mechanisms.

Figure 5:
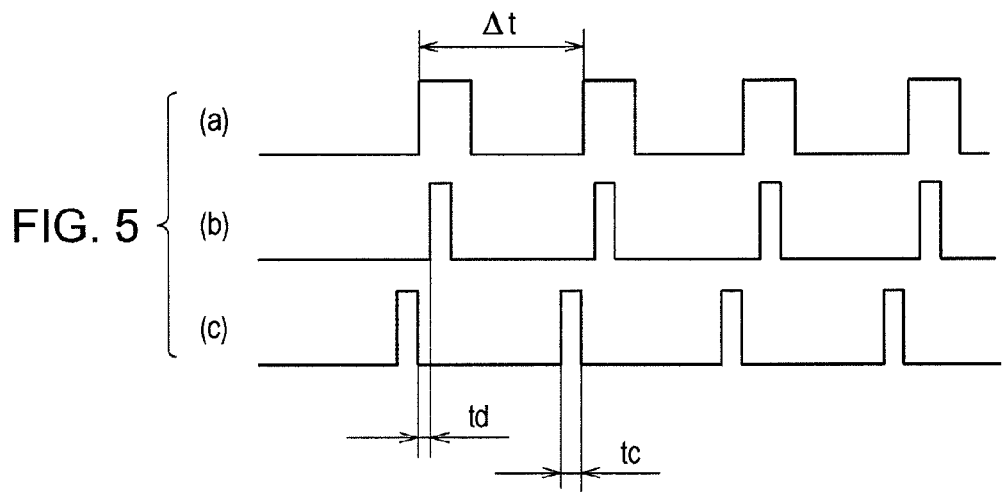
FIG. 5 is an explanatory illustration showing X-ray irradiation timings according to a second embodiment.

A movie typically includes intermittent image frames acquired at a constant time interval. Part (a) of FIG. 5 shows image acquisition timings of the radiation detector 32 according to a second embodiment. As a time interval Δt is decreased, a continuous movie having a reduced uncomfortable seam between frames can be acquired. In view of a resolution of human eyes, the frame rate may be typically 30 frames per second (FPS). Concerning this requirement of the radiation detector 32, irradiation of X-rays is pulse irradiation as shown in part (b) of FIG. 5, but not continuous irradiation. The intermittent pulse irradiation is performed synchronously with imaging of frames even during the rotation operation of the radiation detector 32. Accordingly, an X-ray amount for irradiation can be reduced, and a restriction of use due to heat can be reduced.

Figure 6:
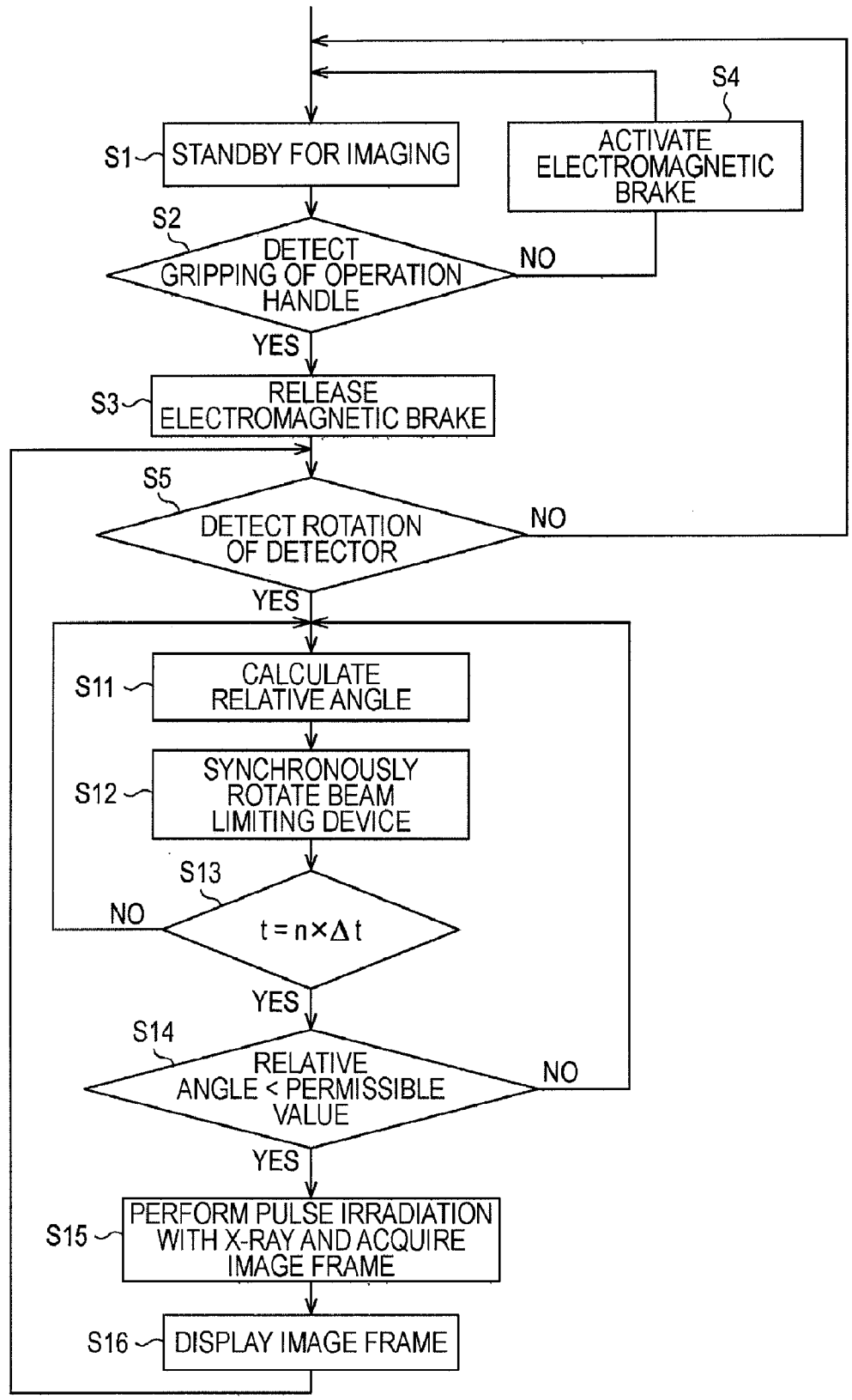
FIG. 6 illustrates a flowchart of a system according to the second embodiment.

FIG. 6 is a flowchart showing an operation according to the second embodiment. In steps S1 to S5, similar processes to those of the flowchart in FIG. 4 are performed. When the operator rotates the radiation detector 32 and the rotation angle is measured in step S5, the operation goes to step S11, in which a relative angle between the radiation detector 32 and the X-ray limiting device 67 is calculated, and then, in step S12, the X-ray limiting device 67 is rotated in accordance with the result obtained in step S11.

Figure 7:
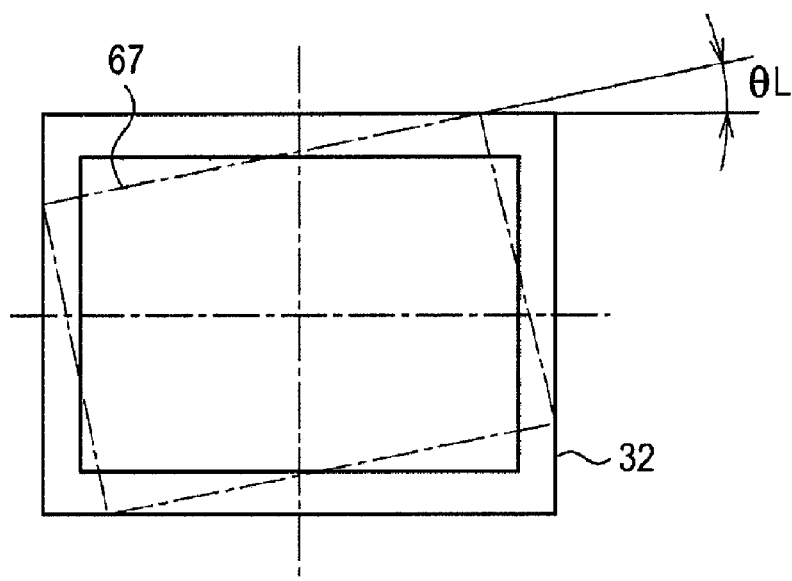
FIG. 7 is an explanatory illustration showing a positional relationship between a detector and a beam limiting region.

During alignment, an X-ray image is acquired through X-ray pulse irradiation at a low frame rate. The operator performs the alignment while the operator checks the position on an image display monitor. At this time, the X-ray limiting device 67 has a beam limiting form covering the effective imaging region as shown in FIG. 7. Unlike the first embodiment, an image can be checked at the end portion of the effective imaging region even during rotation.

Steps S11 and S12 are repeated at a certain time interval. The operation is shifted to a condition determination process every X-ray pulse interval Δt. Step S13 represents that the operation is shifted to step S14 every pulse interval Δt, in which the operation is split when a time t elapsed after step S5 is an integer-n-multiple of Δt.

In the case where the operator rapidly rotates the radiation detector 32, the actuator for rotating the X-ray limiting device 67 cannot follow the rotation, resulting in a time delay. If a relative angle exceeds a permissible value, X-rays may leak to the rear side. Therefore, it is determined whether the relative angle obtained in step S14 is within an allowable range, that is, the permissible value or smaller. As shown in part (c) of FIG. 5, the relative position determination processing is performed at least one time in a non-irradiation period of X-rays.

If the value is the permissible value or smaller, after routine processing as shown in part (c) of FIG. 5 for determining whether the relative angle is the permissive value or smaller, the operation goes to step S15. Immediately after this, acquisition of image frames shown in part (a) of FIG. 5, and X-ray pulse irradiation shown in part (b) of FIG. 5 are performed. Then, in step S16, the obtained image frames are displayed on a monitor while being updated. By repeating steps S5 to S16 described above, the operator can check the alignment using continuous image frames.

In contrast, if the relative angle exceeds the permissible value in step S14, the operation is not shifted to step S15, but returns to routine processing for relative angle correction in steps S11 and S12. At the time when the X-ray limiting device 67 catches the rotation of the radiation detector 32, image acquisition becomes available. With the steps, X-rays can be reliably arranged within the rectangular external shape of the radiation detector 32.

If the relative angle is increased in the middle of image acquisition and then the image acquisition is interrupted, a currently displayed image is not deleted and the frame acquired last is continuously displayed. Accordingly, an image would not be deleted, and a visually continuous image can be provided, thereby reducing an uncomfortable feeling of the operator.

It is noted that a permissible value θ of a relative rotation angle includes a margin. The margin considers a time difference td in FIG. 5 between an end point of the permissible value condition determination process and a start point of the pulse irradiation, for an angle θL in FIG. 7, in a case where a beam limiting form of the X-ray limiting device 67 exceeds the external shape of the radiation detector 32. For example, a value obtained by Expression (1) is determined, in which a relative angular speed ωr is also calculated by the relative angle calculation, the calculated relative angular speed ωr is multiplied by the time difference td, assuming that the resultant value is a margin, and then the margin is subtracted from the angle θL, as follows:

$$\theta = \theta L - \omega r \times td \quad (1)$$

While the condition of step S14 is a physical quantity for determining a relative angle as described above, the condition for determination may be a physical quantity such as a rotation angular acceleration ωd or a rotation speed of the radiation detector 32 as an input. If such a value exceeds a permissible value, the following of the X-ray limiting device 67 may delay, the relative angle may be increased, and thus, the X-ray irradiation region may be misaligned from the radiation detector 32. For example, in a case where the following of the X-ray limiting device 67 is not found according to the rotation angular acceleration ωd of the radiation detector 32, if a condition is provided in which a value is determined to be smaller than a permissible angle θL in a time difference td, a permissible value ωL of the rotation angular acceleration ωd of the radiation detector 32 is set by Expression (2) as follows:

$$\omega L = \theta L / td \quad (2)$$

With this system, a basic performance for preventing X-rays from exceeding the external shape and leaking to the outside of the radiation detector 32, and also, an advantage in efficiency of operation can be provided without narrowing an effective imaging region.

Third Exemplary Embodiment

Figure 8:
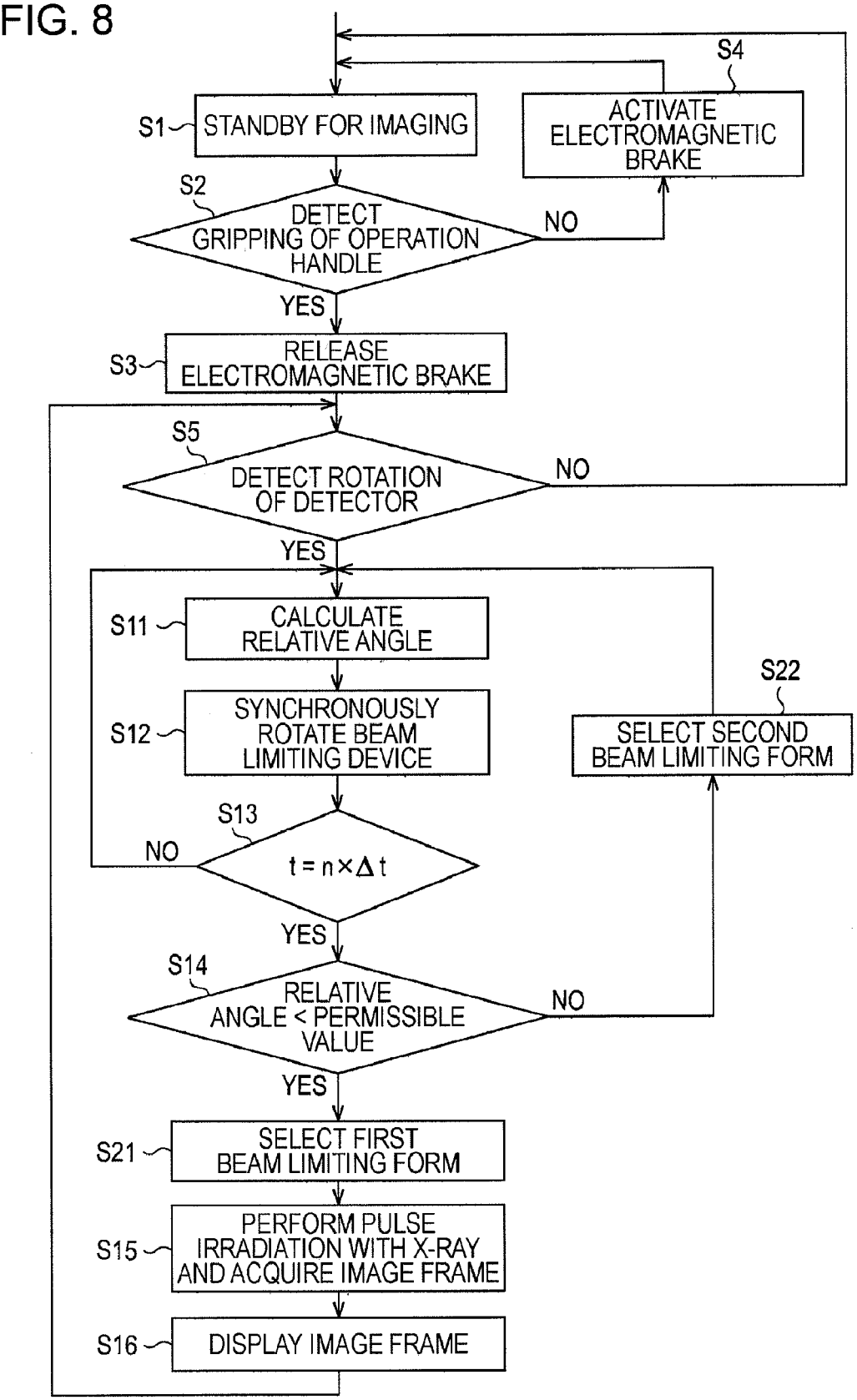
FIG. 8 illustrates a flowchart of a system according to a third embodiment.
Figure 9:
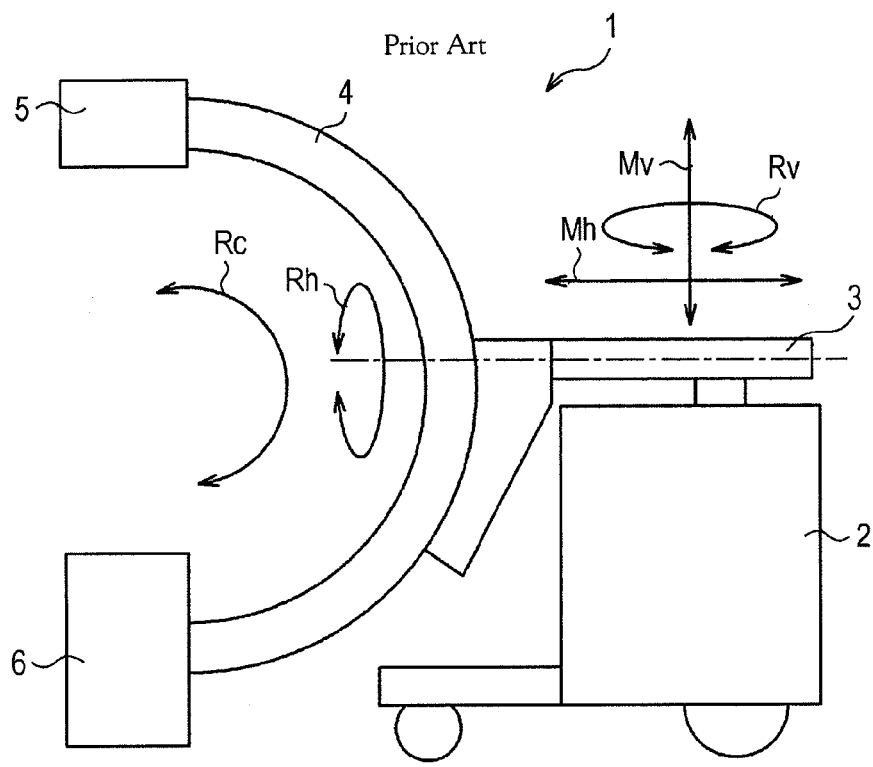
FIG. 9 is a configuration diagram showing a mobile C-arm device according to a related art.
Figure 10:
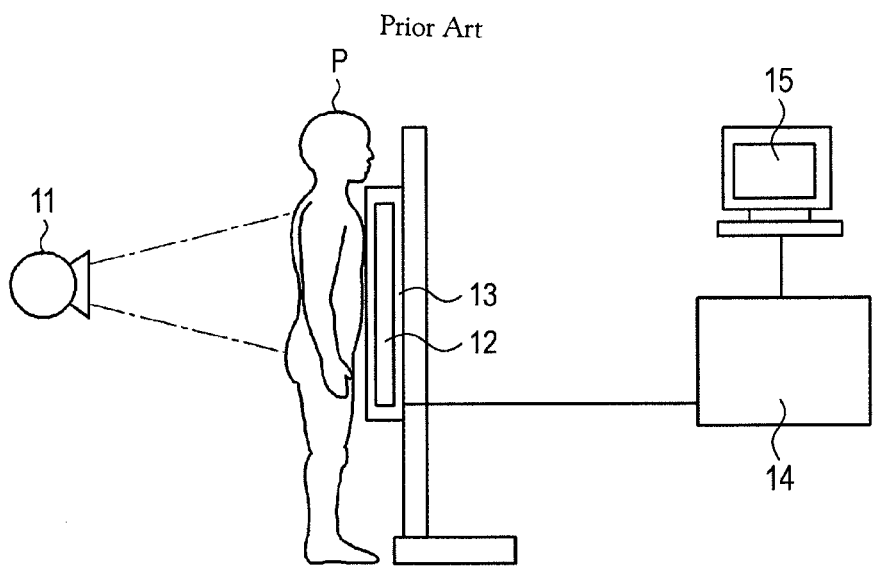
FIG. 10 is a schematic illustration showing a system having a FPD.
Figure 11:
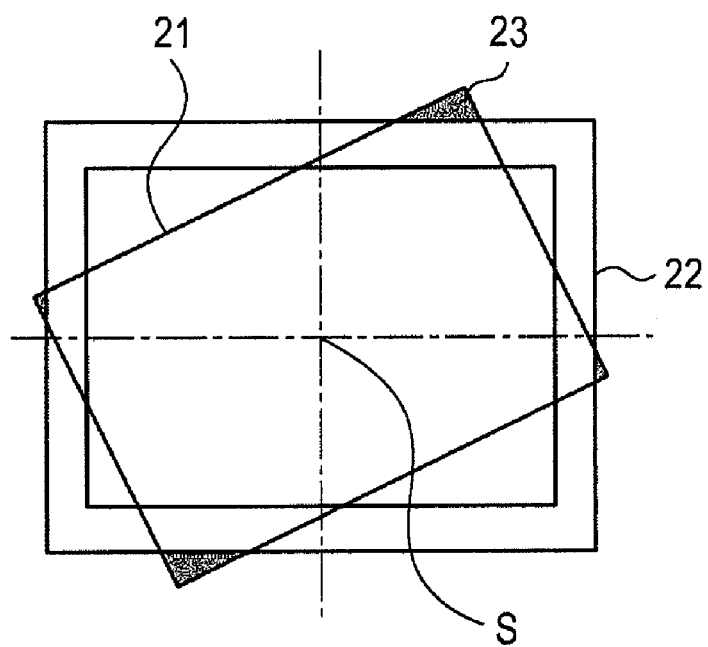
FIG. 11 is an explanatory illustration showing a positional relationship between a detector and a beam limiting region.

A third embodiment is a combination of the first and second embodiments. FIG. 8 shows a flowchart according to the third embodiment. The embodiment is based on the second embodiment, and description of common components and configurations is omitted. The flowchart in FIG. 8 has new step numbers only for processes different from those in FIG. 6.

Step S14 is executed as a process for determining whether X-ray irradiation is available every X-ray pulse interval Δt. If a relative angle between the radiation detector 32 and the X-ray limiting device 67 is a permissible value or smaller, the operation goes to step S21, in which the first beam limiting form 71 covering the effective imaging region is selected. In contrast, if a relative angle exceeds the permissible value, the operation goes to step S22, in which the second beam limiting form 72, 73, or 74 which is constantly arranged within the effective imaging region even during the rotation of the radiation detector 32 is selected. Then, the operation returns to step S11. If the rotation with the rotation mechanism of the X-ray limiting device 67 catches the rotation of the radiation detector 32, and the relative angle is reduced, pulse irradiation and image frame acquisition are started again.

With this system, although the X-ray irradiation region is narrowed, the image can be still checked while X-rays are prevented from leaking even during rapid rotation, thereby providing an advantage in efficiency of operation.

While the present invention has been described with reference to exemplary embodiments, it is to be understood that the invention is not limited to the disclosed exemplary embodiments, and various modifications and changes can be made within the scope of the invention. In particular, while the holding device to be combined employs the mobile C-arm device in the above description, the holding device may be alternatively an upright stand, a universal stand, or the like.

As many apparently widely different embodiments of the present invention can be made without departing from the spirit and scope thereof, it is to be understood that the invention is not limited to the specific embodiments thereof except as defined in the claims.

This application claims the benefit of Japanese Application No. 2007-174700 filed Jul. 3, 2007, which is hereby incorporated by reference herein in its entirety.

What is claimed is:

1. A radiographic imaging apparatus, comprising:
    a radiation source configured to irradiate a subject with radiation;
    a radiation stop unit configured to shape the radiation in a plurality of beam limiting forms;
    a radiation detector including a plurality of detecting units and having a rectangular external shape, said detecting units being arranged in a two-dimensional array, said radiation detector being configured to detect a radiation distribution of the radiation passing through the subject with said detecting units; and
    a supporter configured to hold said radiation detector, wherein said supporter includes:
    a rotation supporting unit configured to support said radiation detector so as to enable rotation of said radiation detector around an axis located substantially at the center of an effective imaging region,
    a rotation sensing unit configured to sense rotation of said radiation detector, and
    a control unit configured to control said radiation stop unit when said rotation sensing unit senses the rotation of said radiation detector so that the beam limiting form of said radiation stop unit is changed so as to be constantly arranged within the effective imaging region of said radiation detector.

2. The radiographic imaging apparatus according to claim 1, wherein said radiation stop unit includes:
    a rectangular first limiting device configured to cover at least an effective imaging region of said radiation detector, and
    a polygonal or circular second limiting device configured to be constantly arranged within the effective imaging region even during rotation of said radiation detector, and
    wherein said second limiting device is used during the rotation of said radiation detector.

3. The radiographic imaging apparatus according to claim 2, further comprising an interruption unit for interrupting irradiation of the subject with the radiation, and
    wherein said radiation stop unit includes
    a rotating unit configured to rotate one of said beam limiting devices within the radiation incidence plane, and
    an aligning unit configured to align the one of said beam limiting devices with the effective imaging region of said radiation detector in accordance with a rotation amount of said radiation detector, and
    wherein if a relative rotation angle between said radiation detector and said radiation beam limiting device exceeds a permissive value, the irradiation of the radiation is interrupted using said interruption unit.

4. The radiographic imaging apparatus according to claim 3, wherein said interruption unit is an operation switch by which said radiation detector is shifted to a rotation operation.

5. The radiographic imaging apparatus according to claim 1, wherein said radiation stop unit includes
    a rectangular first limiting device configured to cover at least an effective imaging region of said radiation detector, and
    a polygonal or circular second limiting device configured to be constantly arranged within the effective imaging region even during rotation of said radiation detector, and
    wherein if a rotation speed or a rotation angular acceleration detected with said rotation sensing unit exceeds a permissible value, said second limiting device is used during the rotation of said radiation detector.

6. The radiographic imaging apparatus according to claim 5, further comprising an interruption unit for interrupting irradiation of the subject with the radiation, and
    wherein said radiation stop unit includes
    a rotating unit configured to rotate one of said beam limiting devices within the radiation incidence plane, and
    an aligning unit configured to align the one of said beam limiting devices with the effective imaging region of said radiation detector in accordance with a rotation amount of said radiation detector, and
    wherein if a relative rotation angle between said radiation detector and said radiation beam limiting device exceeds a permissive value, the irradiation of the radiation is interrupted using said interruption unit.

7. The radiographic imaging apparatus according to claim 6, wherein said interruption unit is an operation switch by which said radiation detector is shifted to a rotation operation.

8. The radiographic imaging apparatus according to claim 1, wherein said rotation sensing unit is a unit configured to measure a rotation angle of said radiation detector.

9. The radiographic imaging apparatus according to claim 1, wherein an image acquired last is displayed while irradiation of the subject with the radiation is interrupted.

10. The radiographic imaging apparatus according to claim 1, wherein said radiation source performs control for intermittent pulse irradiation of the radiation during the rotation of said radiation detector, and performs relative position determination processing at least one time in a non-irradiation period during the pulse irradiation.

11. The radiographic imaging apparatus according to claim 1, wherein said supporter further comprises means for manually rotating said radiation detector.

12. A radiographic imaging apparatus, comprising:
   a radiation detector configured to convert radiation into an image signal;
   a supporter configured to support said radiation detector rotatably around a rotation axis as a rotation center, the rotation axis being located substantially at the center of an effective imaging region;
   a radiation source configured to emit the radiation toward said radiation detector; and
   a changing unit configured to change an irradiation form of the radiation emitted from said radiation source, in accordance with a change in rotation angle with time determined from at least one of an angular speed and an angular acceleration, with respect to the rotation axis of said radiation detector.

13. A method of controlling an irradiation form of radiation emitted from a radiation source, comprising:
   obtaining at least one of an angular speed and an angular acceleration of a radiation detector with respect to a rotation axis, to obtain a change in rotation angle with time, the rotation axis being located substantially at the center of an effective imaging region; and
   changing the irradiation form of the radiation emitted from the radiation source, in accordance with the change with time.

* * * * *